US008607150B2

(12) United States Patent
Tsai

(10) Patent No.: US 8,607,150 B2
(45) Date of Patent: Dec. 10, 2013

(54) SYSTEM AND METHOD FOR DRAGGING IMAGE BETWEEN MULTIPLE WINDOWS

(75) Inventor: Teng-Yu Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 168 days.

(21) Appl. No.: 13/205,822

(22) Filed: Aug. 9, 2011

(65) Prior Publication Data

US 2012/0174012 A1    Jul. 5, 2012

(30) Foreign Application Priority Data

Dec. 31, 2010   (TW) ............................... 99147084 A

(51) Int. Cl.
G06F 3/048        (2013.01)
G09G 5/00         (2006.01)

(52) U.S. Cl.
USPC ............ 715/769; 715/764; 715/770; 345/619

(58) Field of Classification Search
USPC .......... 715/769, 770, 764; 345/682, 672, 646, 345/619, 634, 629, 642, 638, 676, 677, 681, 345/683; 382/162, 164, 167
See application file for complete search history.

(56) References Cited

U.S. PATENT DOCUMENTS

| 6,356,281 | B1 * | 3/2002 | Isenman ..................... | 345/629 |
| 6,628,309 | B1 * | 9/2003 | Dodson et al. ................ | 715/769 |
| 7,752,566 | B1 * | 7/2010 | Nelson ........................ | 715/769 |
| 2007/0226642 | A1 * | 9/2007 | Soulier ........................ | 715/768 |
| 2007/0288599 | A1 * | 12/2007 | Saul et al. .................... | 709/218 |
| 2008/0195969 | A1 * | 8/2008 | Brown et al. ................. | 715/802 |
| 2010/0218130 | A1 * | 8/2010 | Conrad et al. ................ | 715/769 |
| 2011/0292438 | A1 * | 12/2011 | Inami et al. .................. | 358/1.15 |

OTHER PUBLICATIONS

Cesare, "Native Drag and Drop in Adobe Air," Jan. 14, 2010, spreadingfunkyness.com/native-drag-and-drop-in-adobe-air/, pp. 1-10.*
Jaime Rodriguez, "Drag & Drop in WPF," Jul. 12, 2007, blogs.msdn.com, pp. 1-10.*
"Manipulating pixels," Jun. 25, 2010, help.adobe.com, pp. 1-3.*
"Drag and drop into transparent canvas on transparent window," Oct. 12, 2010, social.msdn.microsoft.com, pp. 1-3.*
"Copy/Paste Icons," Feb. 27, 2009, gdgsoft.com, p. 1.*
David Orr, "Drag and Drop Between Any CWnd-Derived Window," Feb. 16, 2000, codeguru.com pp. 1-6.*
"Drag and Drop Overview," Jan. 11, 2010, msdn.microsoft.com, pp. 1-6.*
Mike Schaeffer, "Quick and Dirty Window Transparency," Nov. 19, 2003, codeproject.com, pp. 1-5.*

* cited by examiner

Primary Examiner — Kieu Vu
Assistant Examiner — Asteway T Gattew
(74) Attorney, Agent, or Firm — Altis Law Group, Inc.

(57) ABSTRACT

An image processing system is disclosed. A first window and a second window are displayed on a display. The system detects a drag-and-drop on a portion of an image displayed in a first window. The system presents a transparent window which overlays the first window and the second window and display the bitmap of the image at a first position in the transparent window. The bitmap then moves from the first position to a second position in the transparent window. The system displays the bitmap of the image at the second position in the second window.

20 Claims, 6 Drawing Sheets

SYSTEM AND METHOD FOR DRAGGING IMAGE BETWEEN MULTIPLE WINDOWS

BACKGROUND

1. Technical Field

The disclosure generally relates to an image processing system and an image processing method.

2. Description of Related Art

In an image processing system, images can be displayed in one or more windows on a display. A user can grab an image and drag it from one position to another position in a same window if the window supports this drag-and-drop feature. However, typically the user cannot drag an image from a first window to a second window, because the second window is unable to detect that event. In addition, the source of the image displayed in the first window is unknown to the second window. Therefore, there is room for improvement in this art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
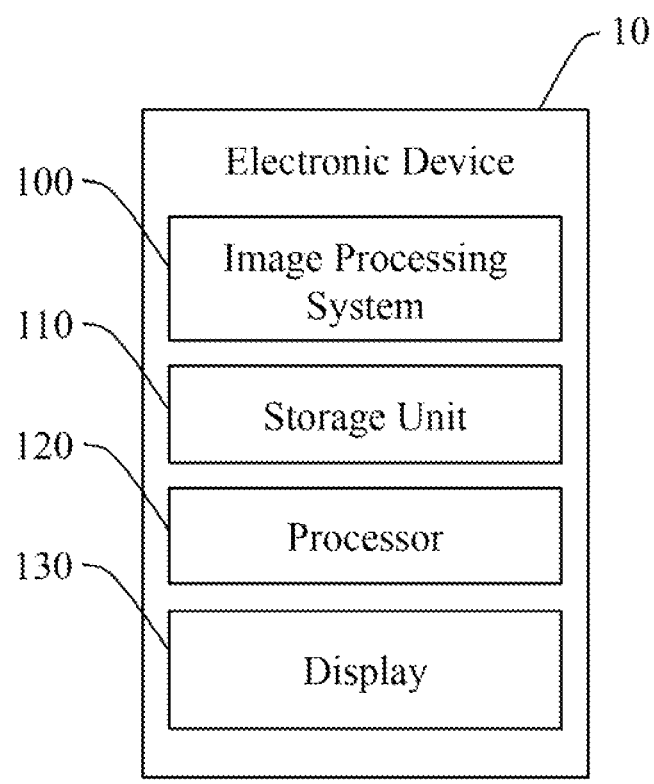
FIG. 1 is a schematic diagram of one embodiment of an electronic device implementing an image processing system.

FIG. 1 is a schematic diagram of one embodiment of an electronic device 10. In the embodiment, the electronic device 10 may include an image processing system 100, a storage unit 110, at least one processor 120, and a display 130. The electronic device 10 can be a general purpose computing device such as an all-in-one computer, a tablet computer, a personal digital assistant (PDA), or a smart phone. The electronic device 10 implements the functions of the image processing system 100. The storage unit 110 may be a magnetic or an optical storage device, such as a hard disk drive, an optical drive, or a tape drive. The storage unit 110 may store a plurality of images, which can be displayed on the display 130 by the image processing system 100.

Figure 2:
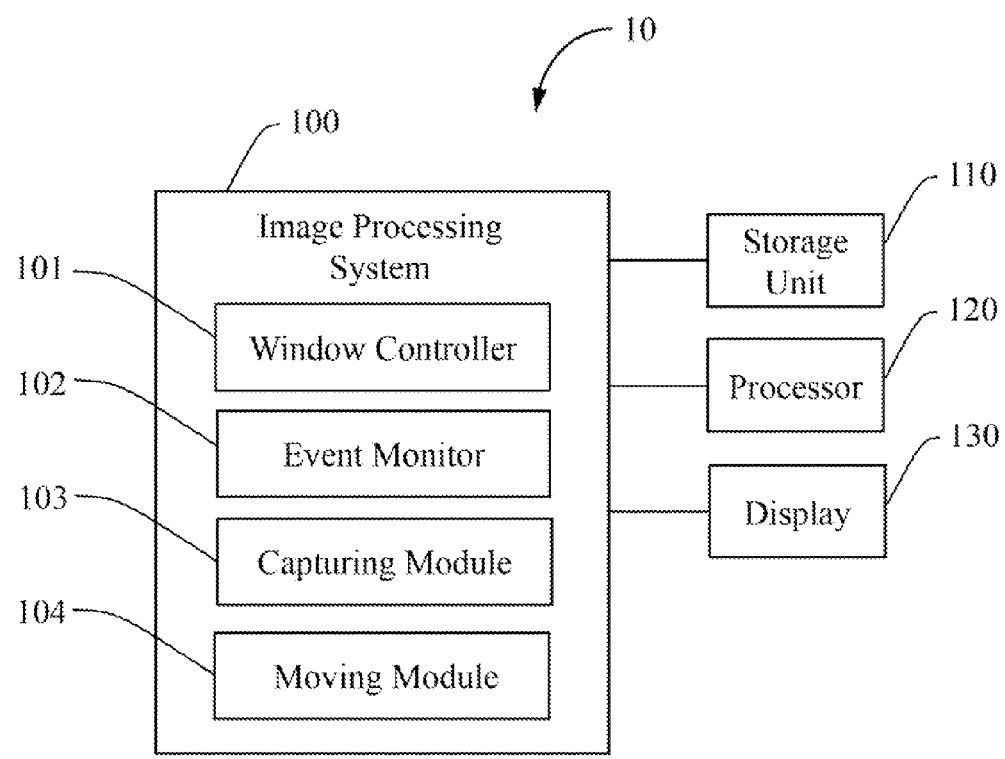
FIG. 2 is a schematic diagram of one embodiment of the function modules of the image processing system of FIG. 1.

FIG. 2 is a schematic diagram of one embodiment of the function modules of the image processing system 100. In the embodiment, the image processing system 100 includes a window controller 101, an event monitor 102, a capturing module 103, and a moving module 104.

The window controller 101 may present a first window and a second window on the display 130, and display an image at a first position in the first window. The image may be read from a local storage such as the storage unit 110 or a remote storage such as an image server on a network. A position may be identified by a set of coordinates such as coordinates of the four corners of a rectangle on the display 130.

The event monitor 102 may detect a drag-and-drop event, which is initiated at a portion of the image displayed in the first window. A typical drag-and-drop can include the basic sequence of actions: press, hold down, drag and drop.

The capturing module 103 may obtain a bitmap of the image from the first window. A bitmap, also referred to as a pixmap, is a type of memory organization or image file format used to store digital images as a spatially mapped array of pixels. The capturing module 103 may store the obtained bitmap in the storage unit 110. To improve the user experience, the window controller 101 may apply an effect to the bitmap of the image displayed in the first window after the capturing module 103 has obtained the bitmap of the image. For example, the window controller 101 may disable one or more RGB channels such as the Red channel of the bitmap displayed in the first window.

When the event monitor 102 detects the drag-and-drop event, the window controller 101 may present a transparent window on the display 130, which overlays the first window and the second window. Each of the windows has an attribute named Z-order index, which specifies the number of the layer where the corresponding window is presented. A value of the Z-order index, such as "0" or an integral number, can be set. A window with a greater Z-order index will be displayed on the front side of another window with a smaller Z-order index. Conversely, a window with a smaller Z-order index will be displayed on the rear side of another window with a greater Z-order index. To make the transparent window overlay the first window and the second window, the Z-order index of the transparent window should be set greater than the Z-order index of both the first window and the second window.

The window controller 101 may display the bitmap of the image at the first position in the transparent window. In order to improve the user experience, the window controller 101 may apply an effect to the bitmap displayed in the transparent window. For example, the window controller 101 may disable one or more RGB channels such as the Blue channel of the bitmap displayed in the transparent window.

The moving module 104 may move the bitmap of the image from the first position to a second position in the transparent window according to the drag-and-drop event. The second position can be determined by when and where the drop action of the drag-and-drop is performed.

When the second position is over a portion of the second window, the window controller 101 may display the bitmap of the image at the second position in the second window.

When the drag-and-drop event is finished, the window controller 101 may revoke the effect of the bitmap displayed in the first window. If one or more RGB channels of the bitmap displayed in the first window are previously disabled, the window controller 101 may enable the disabled one or more RGB channels. In addition, the window controller 101 may revoke displaying the bit map in the transparent window and destroy the transparent window.

Figure 3:
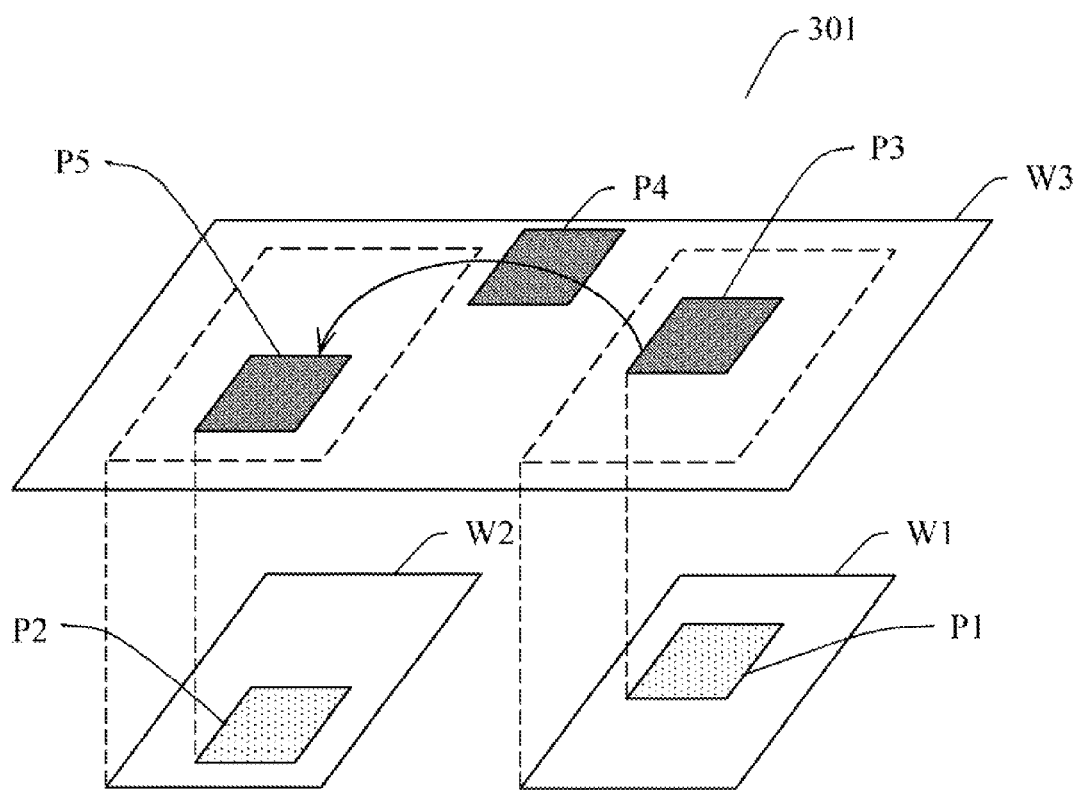
FIG. 3 illustrates a view of one embodiment of a graphic user interface for presenting an image dragged from a window to another window and a corresponding Z-order index table of the windows.

FIG. 3 is an example of a graphic user interface (GUI) 301 for presenting an image dragged from a window to another window and a corresponding Z-order index table 302 of the windows. In this example, the first window W1, the second window W2, and the transparent window W3 are displayed in the GUI. Each of the windows W1-W3 is associated with a Z-order index depicted in the Z-order index table 302. As shown in the Z-order index table 302, the transparent window W3 has the greatest Z-order index "3" among the three windows. Thereby, the transparent window W3 is laid out at the frontmost side and overlays the first window W1 and the second window W2.

In the GUI 301, an image is displayed at a position P1 in the first window W1. When the user begins the drag-and-drop initiated on a portion of the image displayed in the first window W1, the window controller 101 displays the bitmap of the image at a position P3 in the transparent window W3. The position P3 and the position P1 have the same set of coordinates on the display 130. The bitmap is then dragged from the position P3 to a position P4 then to a position P5. When the user completes the drag-and-drop, the window controller 101 displays the bitmap of the image at a position P2 in the second window W2. The position P2 and the position P5 have the same set of coordinates on the display 130.

Figure 4:
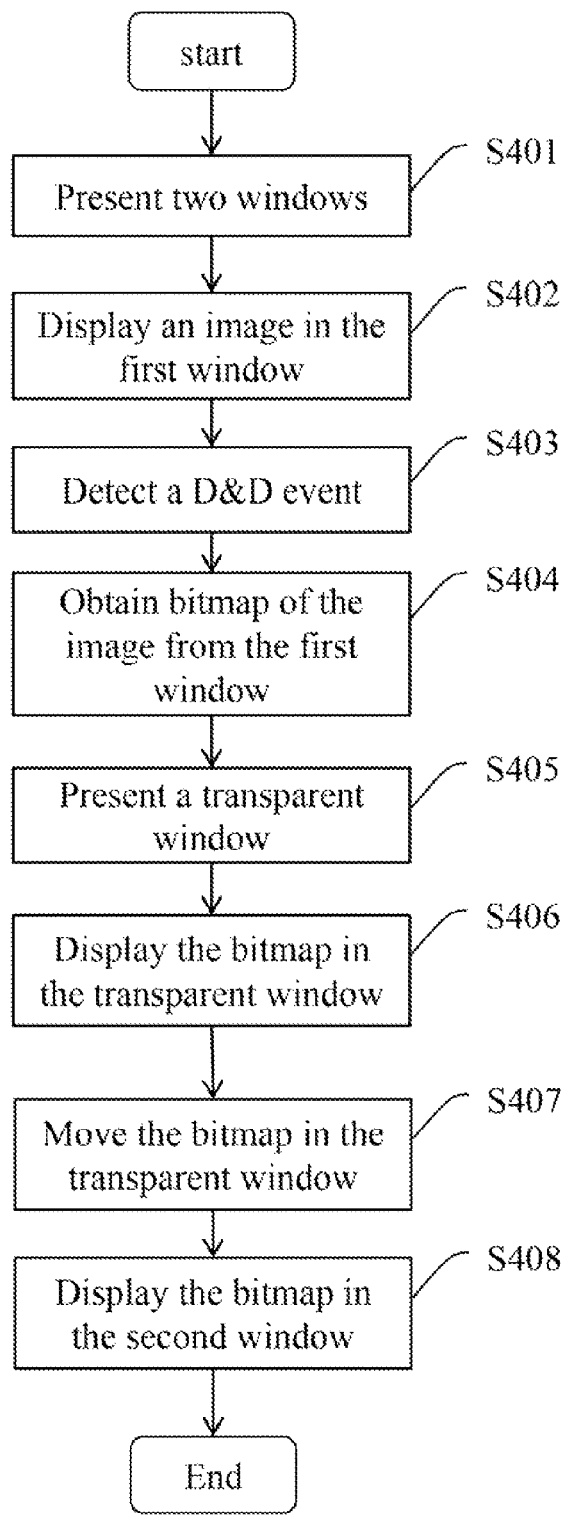
FIG. 4 is an operational flow diagram representing one embodiment of a method for dragging an image from a window to another window.

FIG. 4 is a flowchart illustrating one embodiment of a method for dragging an image from a window to another window. The method may include the following steps.

In step S401, the window controller 101 presents a first window and a second window on the display 130.

In step S402, the window controller 101 displays an image at a first position in the first window.

In step S403, the event monitor 102 detects a drag-and-drop event, which is initiated at a portion of the image displayed in the first window.

In step S404, the capturing module 103 obtains bitmap of the image from the first window.

In step S405, the window controller 101 presents a transparent window on the display 130, which overlays the first window and the second window.

In step S406, the window controller 101 displays the bitmap of the image at the first position in the transparent window.

In step S407, the moving module 104 moves the bitmap of the image from the first position to a second position in the transparent window according to the drag-and-drop event. The second position is over a portion of the second window In step S408, the window controller 101 displays the bitmap of the image at the second position in the second window.

Figure 5:
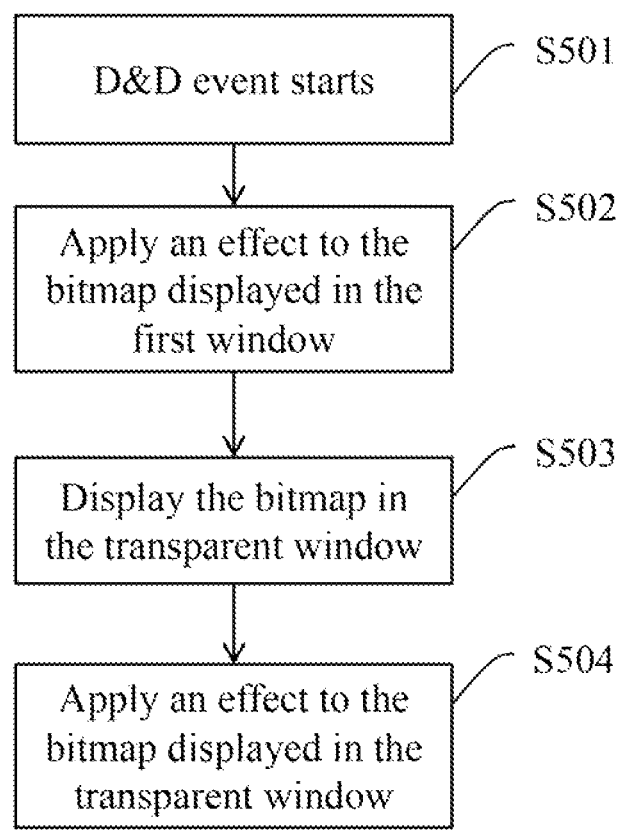
FIG. 5 is an operational flow diagram representing one embodiment of a method for responding to a drag-and-drop event start.

FIG. 5 is a flowchart illustrating one embodiment of a method for responding to a drag-and-drop event start. The method may include the following steps.

In step S501, the event monitor 102 detects that a drag-and-drop event starts, which is initiated at a portion of the image displayed in the first window.

In step S502, the capturing module 103 obtains bitmap of the image from the first window and the window controller 101 applies an effect to the bitmap of the image displayed in the first window.

In step S503, the window controller 101 displays the bitmap of the image in the transparent window.

In step S504, the window controller 101 applies an effect to the bitmap displayed in the transparent window.

Figure 6:
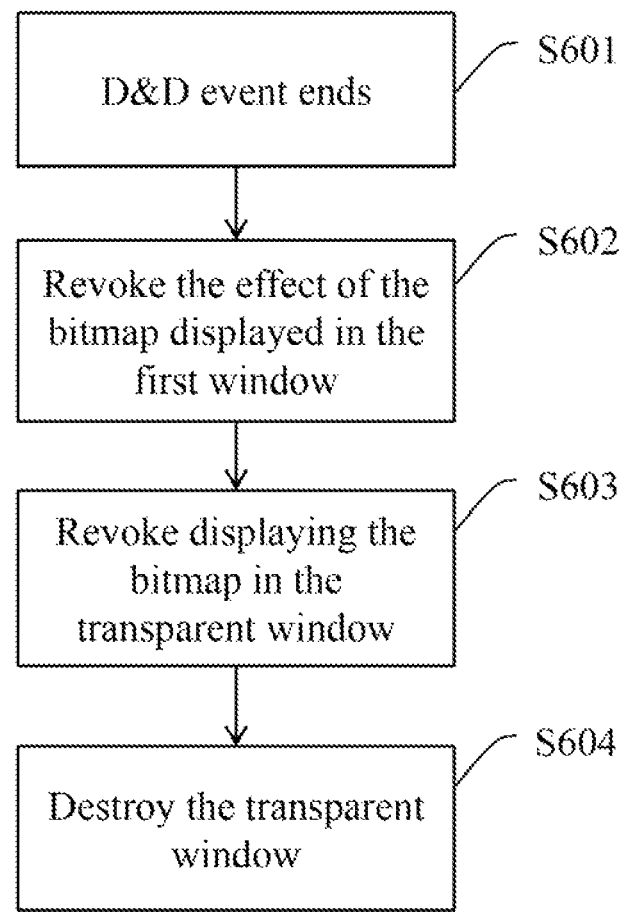
FIG. 6 is an operational flow diagram representing one embodiment of a method for responding to the drag-and-drop event completion.

FIG. 6 is a flowchart illustrating one embodiment of a method for responding to the drag-and-drop event completion. The method may include the following steps.

In step S601, the event monitor 102 detects that the drag-and-drop event ends.

In step S602, the window controller 101 revokes the effect of the bitmap displayed in the first window.

In step S603, the window controller 101 revokes displaying the bitmap in the transparent window In step S604, the window controller 101 destroys the transparent window.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

Depending on the embodiment, certain steps or methods described may be removed, others may be added, and the sequence of steps may be altered. It is also to be understood that the description and the claims drawn for or in relation to a method may include some indication in reference to certain steps. However, any indication used is only to be viewed for identification purposes and not as a suggestion as to an order for the steps.

What is claimed is:

1. A computer-implemented method for processing an image in an electronic device, the method comprising:
   presenting a first window and a second window on a display of the electronic device;
   displaying the image at a first position in the first window;
   detecting a drag-and-drop event, wherein the drag-and-drop event is initiated at a portion of the image displayed in the first window;
   obtaining bitmap of the image from the first window;
   presenting a transparent window on the display, wherein the transparent window overlays the first window and the second window;
   displaying the bitmap of the image at the first position of the transparent window;
   moving the bitmap of the image from the first position to a second position in the transparent window according to the drag-and-drop event, wherein the second position is over a portion of the second window; and
   displaying the bitmap of the image at the second position of the second window.

2. The method of claim 1, further comprising revoking displaying the bitmap of the image in the transparent window after the drag-and-drop event is finished.

3. The method of claim 1, further comprising destroying the transparent window after the drag-and-drop event is finished.

4. The method of claim 1, further comprising applying an effect to the bitmap of the image displayed in the first window when the drag-and-drop event is occurring.

5. The method of claim 4, further comprising revoking the effect of the bitmap of the image displayed in the first window after the drag-and-drop event is finished.

6. The method of claim 1, further comprising disabling one or more RGB channels of the bitmap of the image displayed in the first window while the drag-and-drop event is occurring.

7. The method of claim 6, further comprising enabling the one or more RGB channels of the bitmap of the image displayed in the first window after the drag-and-drop event is finished.

8. The method of claim 1, further comprising applying an effect to the bitmap of the image displayed in the transparent window.

9. The method of claim 1, further comprising disabling one or more RGB channels of the bitmap of the image displayed in the transparent window.

10. The method of claim 1, wherein each of the first position and the second position is identified by coordinates of four corners of a rectangle on the display.

11. An electronic device for processing an image, the electronic device comprising:
    a storage unit;
    at least one processor coupled to the storage unit
    one or more programs being stored in the storage unit and executable by the at least one processor, the one or more programs comprising:
    a window controller adapted to present a first window and a second window on a display of the electronic device, and display the image at a first position in the first window;
    an event monitor adapted to detect a drag-and-drop event, wherein the drag-and-drop even is initiated at a portion of the image displayed in the first window;
    a capturing module adapted to obtain bitmap of the image from the first window, wherein the window controller is further adapted to present a transparent window overlaying the first window and the second window on the display, and display the bitmap of the image at the first position in the transparent window;
    a moving module adapted to move the bitmap of the image from the first position to a second position in the transparent window according to the drag-and-drop event, wherein the second position is over a portion of the second window; and
    wherein the window controller is further adapted to display the bitmap of the image at the second position in the second window.

12. The electronic device of claim 11, wherein the window controller is further adapted to revoke displaying the bitmap of the image in the transparent window after the drag-and-drop event is finished.

13. The electronic device of claim 11, wherein the window controller is further adapted to destroy the transparent window after the drag-and-drop event is finished.

14. The electronic device of claim 11, wherein the window controller is further adapted to apply an effect to the bitmap of the image displayed in the first window when the drag-and-drop event is occurring.

15. The electronic device of claim 14, wherein the window controller is further adapted to revoke the effect of the bitmap of the image displayed in the first window after the drag-and-drop event is finished.

16. The electronic device of claim 11, wherein the window controller is further adapted to disable one or more RGB channels of the bitmap of the image displayed in the first window while the drag-and-drop event is occurring.

17. The electronic device of claim 16, wherein the window controller is further adapted to enable the one or more RGB channels of the bitmap of the image displayed in the first window after the drag-and-drop event is finished.

18. The electronic device of claim 11, wherein the window controller is further adapted to apply an effect to the bitmap of the image displayed in the transparent window.

19. The electronic device of claim 11, wherein the window controller is further adapted to disable one or more RGB channels of the bitmap of the image displayed in the transparent window.

20. The electronic device of claim 11, wherein each of the first position and the second position is identified by coordinates of four corners of a rectangle on the display.

* * * * *